(12) United States Patent
Wan

(10) Patent No.: US 10,228,518 B2
(45) Date of Patent: Mar. 12, 2019

(54) APPARATUS AND METHOD FOR TERMINATING AN ARRAY OF OPTICAL FIBERS

(71) Applicant: Digital Signal Corporation, Chantilly, VA (US)

(72) Inventor: Xiaoke Wan, Fairfax, VA (US)

(73) Assignee: StereoVision Imaging, Inc., Calabasas, CA (US)

( * ) Notice: Subject to any disclaimer, the term of this patent is extended or adjusted under 35 U.S.C. 154(b) by 0 days.

(21) Appl. No.: 15/207,543

(22) Filed: Jul. 12, 2016

(65) Prior Publication Data

US 2017/0160485 A1 Jun. 8, 2017

Related U.S. Application Data

(63) Continuation of application No. 14/325,538, filed on Jul. 8, 2014, now abandoned.

(51) Int. Cl.

| G02B 6/36 | (2006.01) |
|---|---|
| G02B 6/32 | (2006.01) |
| G02B 6/26 | (2006.01) |
| G02B 1/11 | (2015.01) |
| G02B 6/08 | (2006.01) |
| G02B 6/24 | (2006.01) |
| G02B 6/25 | (2006.01) |
| G02B 6/06 | (2006.01) |

(52) U.S. Cl.
CPC ............. *G02B 6/3668* (2013.01); *G02B 1/11* (2013.01); *G02B 6/06* (2013.01); *G02B 6/08* (2013.01); *G02B 6/241* (2013.01); *G02B 6/25* (2013.01); *G02B 6/262* (2013.01); *G02B 6/325* (2013.01); *G02B 6/3644* (2013.01); *G02B 6/3664* (2013.01)

(58) Field of Classification Search
CPC ................ G02B 6/36; G02B 6/32; G02B 6/25
USPC .......................................................... 385/31
See application file for complete search history.

(56) References Cited

U.S. PATENT DOCUMENTS

| 4,184,070 | A | * | 1/1980 | McBride, Jr. | ......... | G02B 6/4249 250/227.24 |
| 4,225,213 | A | * | 9/1980 | McBride, Jr. | .......... | G02B 6/423 250/227.24 |
| 5,179,606 | A | * | 1/1993 | Kaihara | ............. | G02B 6/29332 385/45 |
| 5,546,212 | A | * | 8/1996 | Kunikane | ............. | G02B 6/4246 385/33 |
| 5,682,452 | A | * | 10/1997 | Takahashi | ............. | G02B 6/2937 385/34 |
| 6,010,251 | A | * | 1/2000 | Koyanagi | ............. | G02B 6/4207 359/819 |
| 6,059,462 | A | * | 5/2000 | Finak | ................... | G02B 6/2937 385/51 |

(Continued)

*Primary Examiner* — Kaveh C Kianni
(74) *Attorney, Agent, or Firm* — Toering Patents PLLC

(57) ABSTRACT

A method for terminating a plurality of optical fibers arranged in a two-dimensional arrangement comprises inserting the plurality of optical fibers into and through a fiber ferrule, where the fiber ferrule has a plurality of parallel channels extending from an entry surface through to a polish surface; polishing the polish surface including an end of each of the plurality of optical fibers to form a coplanar surface at a polish angle relative to a reference plane perpendicular to the parallel channels; and affixing a glass plate to the polish surface.

11 Claims, 5 Drawing Sheets

(56) References Cited

U.S. PATENT DOCUMENTS

| | | | |
|---|---|---|---|
| 6,196,732 B1* | 3/2001 | Tamekuni | B24B 19/226 385/78 |
| 6,477,289 B1* | 11/2002 | Li | G02B 6/29364 359/837 |
| 6,546,169 B1* | 4/2003 | Lin | G02B 6/262 385/27 |
| 8,711,336 B1* | 4/2014 | Frogget | G01S 7/4812 356/27 |
| 2002/0064191 A1* | 5/2002 | Capewell | G02B 6/29367 372/14 |
| 2002/0081066 A1* | 6/2002 | Brun | G02B 6/2937 385/34 |
| 2002/0081067 A1* | 6/2002 | Brun | G02B 6/29364 385/34 |
| 2002/0094172 A1* | 7/2002 | Brun | G02B 6/2937 385/78 |
| 2002/0106153 A1* | 8/2002 | Wu | G02B 6/32 385/33 |
| 2002/0106155 A1* | 8/2002 | Brun | G02B 6/2937 385/34 |
| 2002/0110322 A1* | 8/2002 | Brun | G02B 6/29364 385/33 |
| 2002/0118929 A1* | 8/2002 | Brun | G02B 6/2937 385/84 |
| 2002/0131699 A1* | 9/2002 | Raguin | G02B 6/322 385/33 |
| 2002/0146210 A1* | 10/2002 | Lewis | G02B 6/2746 385/61 |
| 2002/0197020 A1* | 12/2002 | Qian | G02B 6/327 385/80 |
| 2003/0026540 A1* | 2/2003 | Fukuzawa | G02B 6/2937 385/34 |
| 2003/0081897 A1* | 5/2003 | Itoh | G02B 3/04 385/34 |
| 2003/0128916 A1* | 7/2003 | Sasaki | G02B 6/4246 385/24 |
| 2003/0185513 A1* | 10/2003 | Hellman | G02B 6/2937 385/47 |
| 2004/0101235 A1* | 5/2004 | Chamness | G02B 6/2937 385/24 |
| 2004/0114862 A1* | 6/2004 | Taniyama | G02B 6/262 385/34 |
| 2004/0151431 A1* | 8/2004 | Ukrainczyk | G02B 6/2552 385/33 |
| 2005/0147345 A1* | 7/2005 | Hata | G02B 6/29368 385/24 |
| 2005/0163423 A1* | 7/2005 | Wang | G02B 6/2937 385/33 |
| 2006/0245691 A1* | 11/2006 | Wang | G02B 6/2937 385/33 |
| 2007/0086707 A1* | 4/2007 | Suzuki | G02B 6/255 385/58 |
| 2009/0207495 A1* | 8/2009 | Yamaguchi | G02B 5/286 359/588 |
| 2009/0232454 A1* | 9/2009 | Takahashi | G02B 6/3825 385/54 |
| 2009/0324169 A1* | 12/2009 | Dang | G02B 6/2804 385/33 |
| 2011/0182586 A1* | 7/2011 | Ji | G02B 6/2937 398/88 |
| 2011/0299811 A1* | 12/2011 | O'Brien | G02B 6/32 385/26 |
| 2012/0251045 A1* | 10/2012 | Budd | G02B 13/22 385/33 |
| 2012/0330101 A1* | 12/2012 | Brennan | A61B 1/00096 600/177 |
| 2013/0011100 A1* | 1/2013 | Shiraishi | G02B 6/3861 385/77 |
| 2013/0071063 A1* | 3/2013 | Aoki | G02B 6/32 385/33 |
| 2013/0223798 A1* | 8/2013 | Jenner | G02B 6/3604 385/77 |
| 2013/0223801 A1* | 8/2013 | Bhagavatula | G02B 6/2552 385/93 |
| 2014/0169743 A1* | 6/2014 | Hodge | G02B 6/3885 385/54 |
| 2014/0321814 A1* | 10/2014 | Chen | G02B 6/32 385/79 |
| 2015/0104135 A1* | 4/2015 | Bushnell | G02B 6/325 385/79 |
| 2015/0304043 A1* | 10/2015 | Aitken | G02B 6/3604 398/115 |
| 2016/0282562 A1* | 9/2016 | Takamizawa | G02B 6/325 |

* cited by examiner

APPARATUS AND METHOD FOR TERMINATING AN ARRAY OF OPTICAL FIBERS

CROSS-REFERENCE TO RELATED APPLICATIONS

This application is a continuation of U.S. patent application Ser. No. 14/325,538, entitled "Apparatus and Method for Terminating an Array of Optical Fibers," which was filed on Jul. 8, 2014, and is incorporated herein by reference in its entirety.

FIELD OF THE INVENTION

The invention is generally related to terminating an array of optical fibers, and more particularly, to terminating a two-dimensional fiber array using single-plane fiber termination.

BACKGROUND OF THE INVENTION

Arrays of optical fibers, or "fiber arrays," are widely used in fields such as imaging, optical communications, remote sensing, and astronomy. One-dimensional ("1D") fiber arrays (i.e., N-by-1 fiber arrays) integrate multiple fibers in a line in a compact optical device and offer multiplexing capability. Two-dimensional ("2D") fiber arrays (i.e., N-by-M fiber arrays) enhance compactness and multiplexing capabilities by increasing packing density and further, provide an ability to address two dimensional spatial information in a straight-forward manner. Conventional array structures such as silicon v-grooves, glass v-grooves, glass ferrules provide precise fiber positioning yet are efficient and cost effective to manufacture.

A uncoated optical fiber end suffers from an approximate four percent (4%) Fresnel reflection which then couples back into the fiber if the fiber is perpendicularly terminated. In many applications, ends of optical fibers require different termination techniques to reduce insertion loss and/or increase return rejection. Return rejection is a concern when a laser cavity or optical amplifier is sensitive to feedback of a coupling fiber. High return loss is required in lidar (i.e., laser radar) remote sensing applications, because a small amount of surface reflection coupling back into the fiber may overwhelm as sensed return signal.

Conventional techniques for addressing return rejection and/or insertion loss include anti-reflective coatings or angle polishing/cleaving techniques. Requirements for high return loss are difficult to meet solely by applying AR coating on a terminated fiber array. Although angle termination is suitable for a single fiber or a 1D fiber array, angle terminating a 2D fiber array can be very challenging if the 2D fiber array is needed for lens imaging applications. As illustrated in FIG. 5, the fiber ends of a two-by-two fiber array have to be arranged step wise one row next to another, such that the optimal imaging can be achieved by positioning all fiber ends on a desired plane defined by the lens imaging system. As illustrated, the ends of the fibers in a given row share a common plane; but the ends of the fibers in different rows are on different planes. However, fabricating the stepwise angle terminated fiber array involves complex processes or special tools.

What is needed is an improved mechanism for terminating a two-dimensional fiber array that does not suffer the performance or manufacturing drawbacks of conventional systems.

SUMMARY OF THE INVENTION

According to various implementations of the invention, a method for terminating a plurality of optical fibers arranged in a two-dimensional arrangement comprises inserting the plurality of optical fibers into and through a fiber ferrule, where the fiber ferrule has a plurality of parallel channels extending from an entry surface through to a polish surface; polishing the polish surface including an end of each of the plurality of optical fibers to form a coplanar surface at a polish angle relative to a reference plane perpendicular to the parallel channels; and affixing a glass plate to the polish surface.

These implementations, their features and other aspects of the invention are described in further detail below.

DETAILED DESCRIPTION

Figure 1:
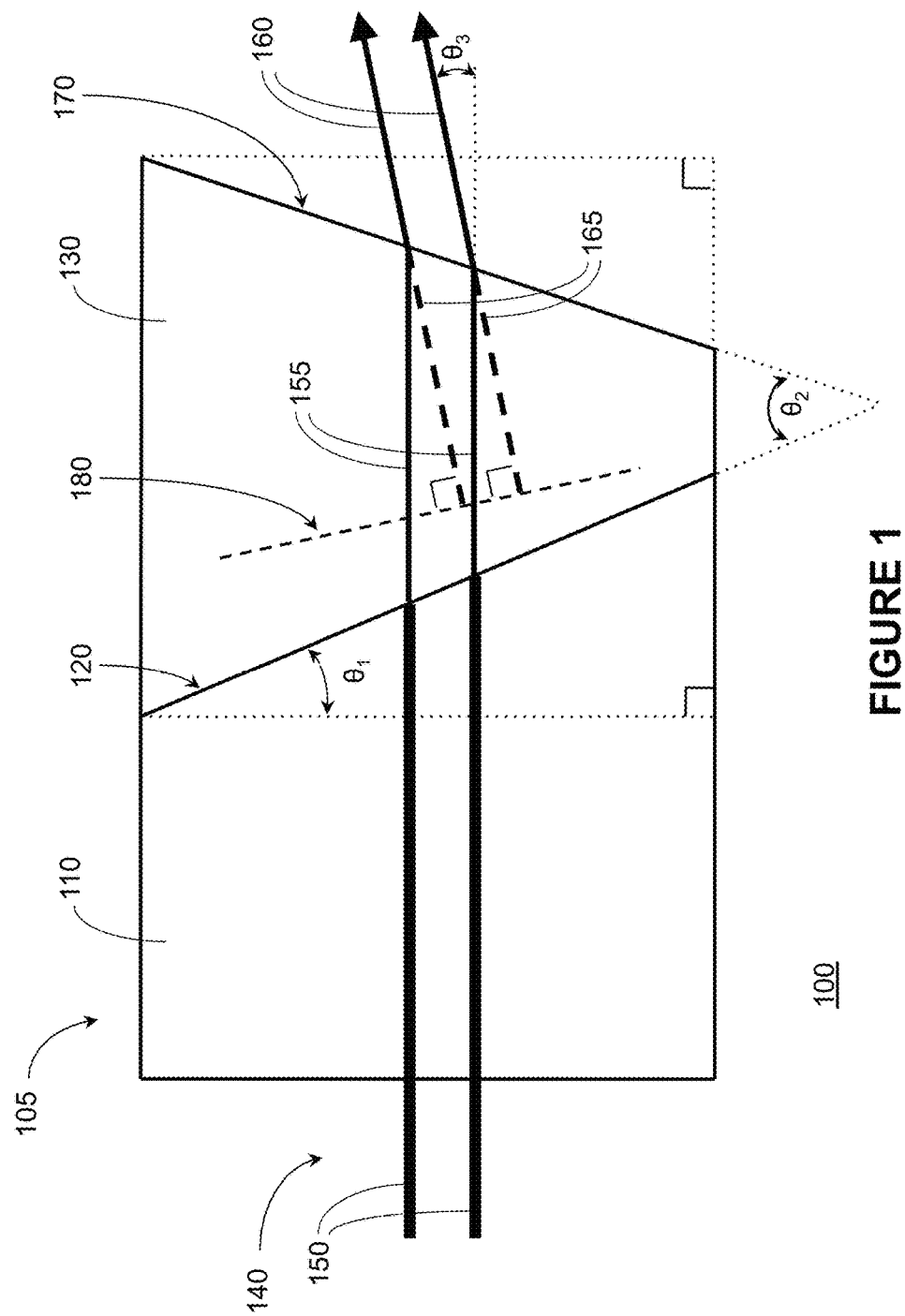
FIG. 1 illustrates a termination assembly with a 2D fiber array terminated according to various implementations of the invention.

FIG. 1 illustrates a termination assembly 100 useful in connection with a two-dimensional arrangement 140 of optical fibers 150. In some implementations of the invention, termination assembly 100 includes a fiber ferrule 110 and a compensating wedge plate 130. In some implementations of the invention, a fiber array 105 is formed by inserting optical fibers 150 through multi-channel fiber ferrule 110 and by affixing them therein using conventional techniques. In some implementations of the invention, fiber ferrule 110 has circular holes, or other regulating channels, such as triangular or hexagonal channels, formed therein in a desired two-dimensional arrangement, where each of such holes/channels accommodates a single optical fiber 150. In some implementations of the invention, fibers 150 are bundled next to each other with minimal gaps to form a high density fiber array. A surface 120 (also referred to herein as a "single-plane") of fiber ferrule 110 is formed by grinding and/or polishing surface 120 of fiber ferrule 110 (now also referred to as fiber array 105), including ends of fibers 150 at a polish angle $\theta_1$. According the various implementations of the invention, fiber array 105, due to angled, polished surface 120, provides high return loss capabilities. In other words, that portion of optical signals travelling through fiber 150 (also referred to herein as "optical beam(s)") that are reflected off terminated end 220 (illustrated in FIG. 2) do so at an angle that reduces or eliminates such reflected signals from being reflected back into fiber 150.

Figure 2:
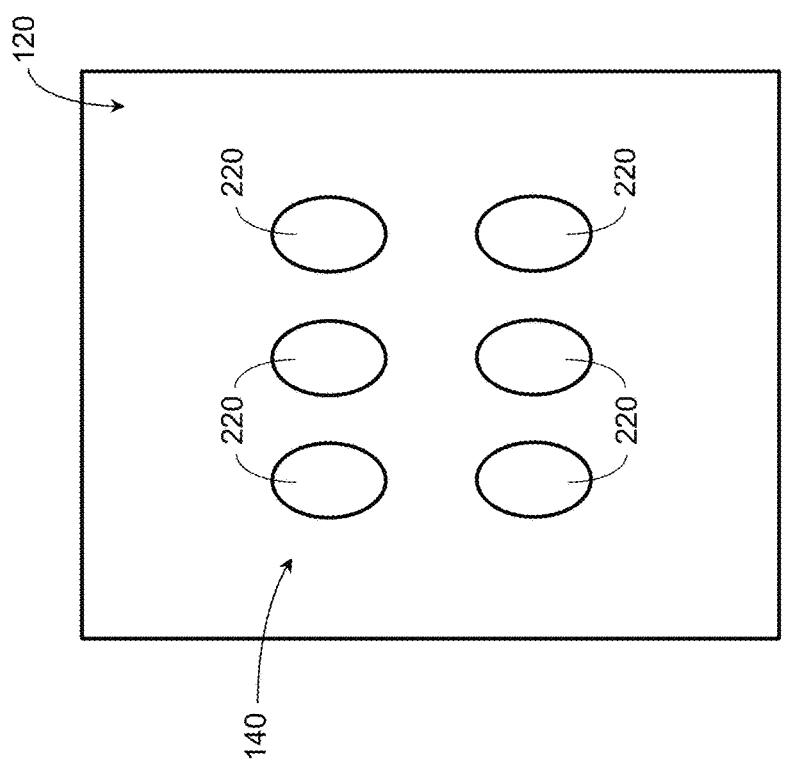
FIG. 2 illustrates a 2D fiber array terminated in a single plane according to various implementations of the invention.

FIG. 2 illustrates surface 120 from perspective perpendicular to surface 120 after fiber ferrule 110 and fibers 150 are polished (or more particularly, ends 220 of fibers 150 are polished). In some implementations of the invention, surface 120 of fiber array 105 includes two-dimensional arrangement 140 of terminated ends 220 of fibers 150. As illustrated in FIG. 2, surface 120 includes a 2-row-by-3-column arrangement 140 of fibers 150; other two-dimensional arrangements 140 may be used including two-dimensional arrangements other than row-by-column arrangement as would be appreciated.

Compensating glass plate or wedge plate 130 has a mating surface that mates wedge plate 130 to surface 120 of fiber ferrule 110, including ends 220 of fibers 150. According to various implementations of the invention, wedge plate 130 is formed having a wedge angle $\theta_2$ between mating surface and an emergent surface 170 as will be described in further detail below. In some implementations of the invention, wedge plate 130 is formed from a material that matches various optical and mechanical properties of fibers 150. In some implementations of the invention, wedge plate 130 is formed from silica glass to match various optical and mechanical properties of fibers 150 also formed from silica glass. Other materials may be used as would be appreciated.

In some implementations of the invention, wedge plate 130 is attached to fiber array 105. In some implementations of the invention, wedge plate 130 is affixed to fiber array 105 using epoxy or other affixing agents. In some implementations of the invention, the epoxy or other affixing agents matches an index of wedge plate 130 and fibers 150 to minimize insertion loss as would be appreciated. In some implementations of the invention, the epoxy or other affixing agent encloses ends 220 of fibers 150 and/or conceal any imperfections in the surfaces of ends 220 of fibers 150 to further improve return loss performance.

In some implementations of the invention, ends 220 of fibers 150 directly affix to wedge plate 130 (via epoxy or other affixing agent). In some implementations of the invention, ends 220 of fibers 150 may be detached from wedge plate 130; doing so should not significantly affect return loss performance or imaging condition.

Optical beams carried by fibers 150 embedded in fiber ferrule 110 emerge from ends 220 of fibers 150 and enter wedge plate 130 as optical beams 155. In some implementations, these optical beams 155 pass through epoxy or other affixing agents after emerging from ends 220 of fibers 150 and prior to entering wedge plate 130. Optical beams 155 pass through wedge plate 130 and emerge from emergent surface 170 as optical beams 160 at an angle $\theta_3$ from an original path of fibers 150.

From a perspective in an exterior medium (i.e., from a medium outside of wedge plate 130, such as air), each of ends 220 projects back into wedge plate 130 onto a single apparent plane 180. Apparent plane 180 may be adjusted (i.e., tilted) by changing wedge angle, $\theta_2$. In some implementations of the invention, an optimal wedge angle, $\theta_2$, occurs when apparent plane 180 is normal to (i.e., perpendicular to) a chief ray direction of optical beams 160 emergent from wedge plate 130 as illustrated in FIG. 1. When an imaging lens (not otherwise illustrated) is aligned to the chief ray directions of optical beams 160, optical beams 160 may be focused onto a target plane normal to the optical axis with minimal image degradation. However, in some implementations of the invention, optical beams 160 emerging from wedge plate 130 may be bent relative to the parallel fibers 150.

In some implementations of the invention, other wedge angles may be used to tilt the target plane for a various reasons, including, but not limited to compensating for aberration or to accommodate various optical components such as lens arrays, Fresnel lens structures or grating structures (none of which are otherwise illustrated).

A total apparent length of a refracted optical array is given by $\Sigma_i l_i/n_i$, where $l_i$ is the segmental ray distance and $n_i$ is the local refractive index. The apparent lengths may be equalized even through optical signals travel along different paths. Employing Snell's law and some elementary geometry, an optimal relation between surface 120 and emergent surface 170 may be expressed as $2 \sin \theta_2 = n^2 \sin 2(\theta_2 - \theta_1)$, where n is the common refractive index of fibers 150 and wedge plate 130. For a standard polishing angle of eight degrees (i.e., $\theta_1 = 8°$), wedge angle $\theta_2$ is approximately fifteen degrees (i.e., $\theta_2 \approx 15°$ and optical signals 160 emerge from emergent surface 170 bent at an angle of approximately three and one half degrees (i.e., $\theta_3 \approx 3.5°$.

In some implementations of the invention, because the compensation provided by wedge plate 130 is not affected by translation of wedge plate 130 and not sensitive to a roll of wedge plate 130, aligning and affixing fiber ferrule 110 with wedge plate 130 may be quite straight-forward and robust.

In some implementations of the invention, emergent surface 130 may be coated with an anti-reflective coating to reduce insertion loss. In some implementations of the invention, emergent surface 130 may be left uncoated for attaching additional optical components as would be appreciated.

Figure 4:
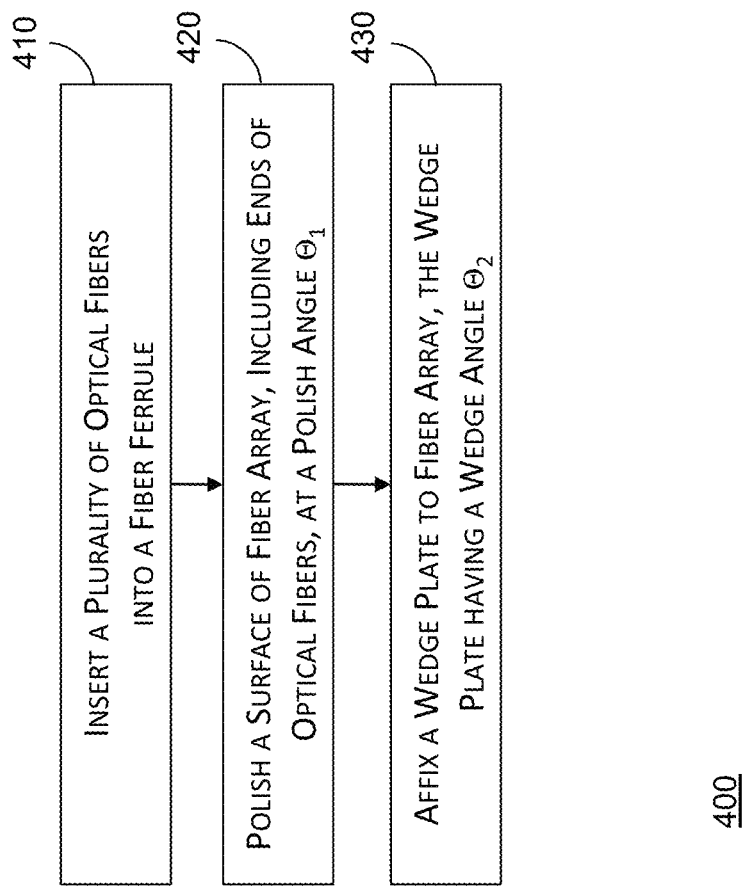
FIG. 4 illustrates a process for forming a termination assembly to various implementations of the invention.
Figure 5:
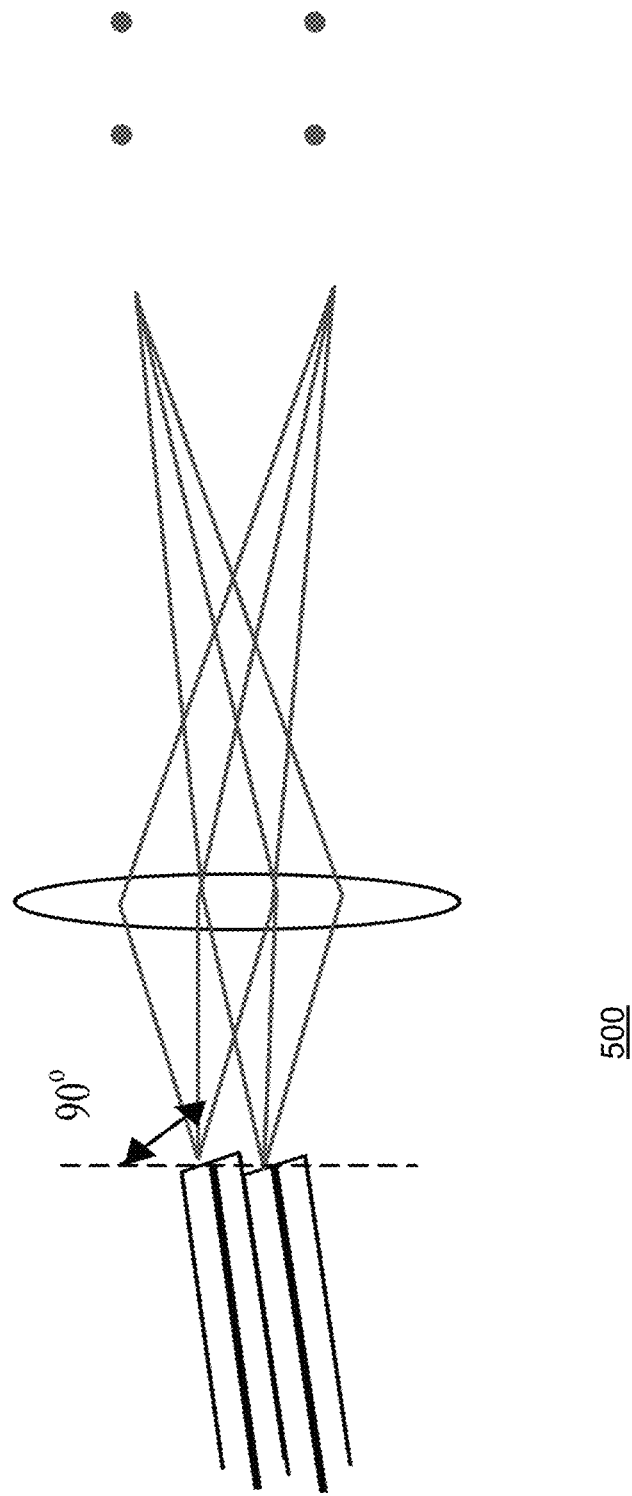
FIG. 5 illustrates a conventional solution for terminating a 2D fiber array.

FIG. 4 illustrates a process 400 for forming a termination assembly according to various implementations of the invention. In an operation 410, a plurality of optical fibers 150 are inserted into a fiber ferrule 110. In an operation 420, a surface 120 of fiber array 105 (including a surface of ferrule 110 and ends 220 of fibers 150) are ground and/or polished at polish angle $\theta_1$. In an operation 430, a wedge plate 130 is affixed to fiber array 105, where wedge plate 130 has a wedge angle of $\theta_2$.

Figure 3:
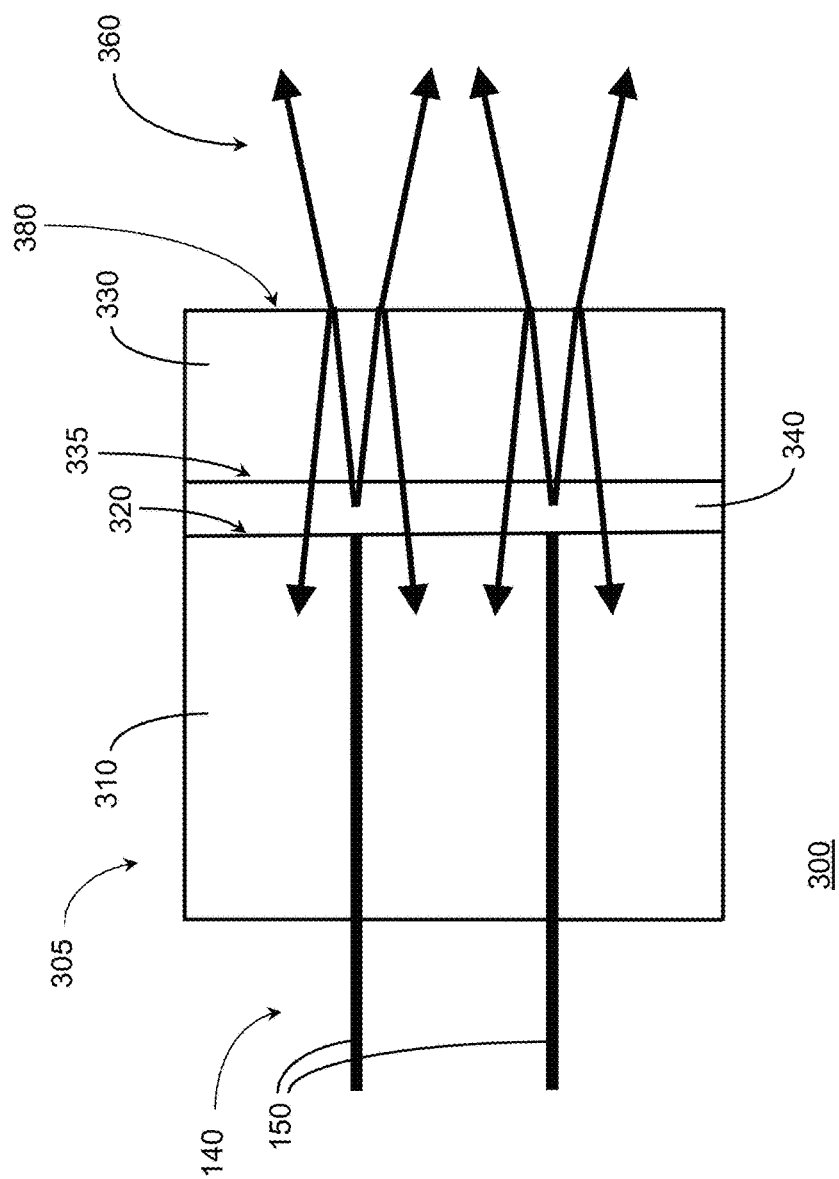
FIG. 3 illustrates a termination assembly with a 2D fiber array terminated according to various implementations of the invention.

FIG. 3 illustrates a termination assembly 300 useful in connection with a two-dimensional arrangement 140 of optical fibers 150. In some implementations of the invention, termination assembly 300 includes a polished, single-plane fiber ferrule 310 and a glass plate or plane window 330. In some implementations of the invention, a fiber array 305 is formed by inserting optical fibers 150 through a multi-channel ferrule 310 and by affixing them therein using conventional techniques. In some implementations of the invention, ferrule 310 has circular holes or other regulating channels, such as triangular or hexagonal channels, formed therein in a desired two-dimensional arrangement, where each of such holes/channels accommodates a single optical fiber 150. In some implementations of the invention, fibers 150 are bundled together with minimal gaps. A surface 320 (also referred to herein as a "single-plane") of single-plane fiber ferrule 310 is formed by grinding and/or polishing fiber ferrule 110, including ends 220 of fibers 150 at a polish angle $\theta_1$, which in these implementations of the invention, is zero degrees (i.e., $\theta_1 = 0°$).

In some implementations of the invention, plane window 330 may be directly affixed to surface 320 of fiber ferrule 310 (now also referred to as fiber array 305). In some implementations of the invention, plane window 330 may be directly affixed to surface 320 of fiber array 305 310 using index matching agents to minimize surface reflection (i.e., reflection of optical signals off of plane window 330 and back into fibers 150). In some implementations of the invention, plane window 330 is formed from silica glass. In some implementations of the invention, for a single mode fiber or a small core fiber, whose Raleigh range is roughly 100 μm, plane window 330 may be a few millimeters thick. Such a thin plane window 330 should result in little, if any, Fresnel reflection that would couple back to fibers 150.

In some implementations of the invention, emergent surface 380 of plane window 330 may be coated with an anti-reflective coating to reduce any return loss from emergent surface 380. In some implementations of the invention, further improvements may be achieved if an index matching film 340 is precisely controlled to create destructive interference between two Fresnel reflections occurring at index matching film 340. When fibers 150 and plane window 330 are formed from the same material, complete cancellation may occur. In some implementations, a thickness of index matching film 340 may be actively controlled during manufacturing by using a sensor to monitor a return loss as would be appreciated. In some implementations of the invention, UV epoxy may be used because its curing process may be readily controlled as would be appreciated.

Implementations of the invention illustrated generally in FIG. 1 may have return losses better than −60 dB, whereas implementations of the invention illustrated generally in FIG. 3 may have return losses approaching −50 dB. Hence, for less stringent applications, the implementations of FIG. 3 may be attractive over the implementations of FIG. 1 due to simpler manufacturing processes. Further, the implementations of FIG. 3 provide a straight-line optical path through termination assembly 300 whereas, the optical path is bent by termination assembly 100.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A termination assembly comprising:
   a fiber ferrule having a plurality of channels extending from an entry surface through to a polishing surface, wherein the plurality of channels are arranged in a two-dimensional arrangement;
   a plurality of optical fibers, each of the plurality of optical fibers extending through one of the plurality of channels of the fiber ferrule, each of the plurality of optical fibers parallel to one another, each of the plurality of optical fibers having an end coplanar with the polishing surface of the fiber ferrule and coplanar with an end of each other of the plurality of optical fibers;
   a wedge plate having a mating surface and an emergent surface, wherein the wedge plate has a wedge angle between the mating surface and an emergent surface; and
   an affixing agent disposed between and affixing the polishing surface of the fiber ferrule to the mating surface of the wedge plate,
   wherein the termination assembly is configured such that optical signals from the plurality of optical fibers emerge from the emergent surface of the wedge plate at a non-zero angle relative to an original path of the plurality of optical fibers.

2. The termination assembly of claim 1, wherein the polishing surface of the fiber ferrule is at a polishing angle relative to a reference plane perpendicular to the plurality of optical fibers.

3. The termination assembly of claim 2, wherein the polishing angle is greater than 0 degrees.

4. The termination assembly of claim 1, wherein the wedge plate is formed from silica glass, and wherein the plurality of optical fibers are formed from silica glass.

5. The termination assembly of claim 1, wherein the polishing angle is 8 degrees, and the wedge angle is approximately 15 degrees.

6. The termination assembly of claim 1, wherein an apparent fiber emitting plane is tilted relative to the reference plane.

7. The termination assembly of claim 1, wherein a refractive index of the affixing agent is approximately the same as that of the plurality of optical fibers.

8. The termination assembly of claim 7, wherein a refractive index of the wedge plate is approximately the same as that of the plurality of optical fibers.

9. The termination of assembly of claim 1, wherein the affixing agent is ultra-violet epoxy.

10. The termination of claim 1, wherein the fiber ferrule and the plurality of optical fibers collectively form a two-dimensional fiber array.

11. The termination of claim 1, wherein the plurality of channels are arranged in an N-by-M arrangement, where neither N nor M is equal to one.

* * * * *